(12) United States Patent
Jo

(10) Patent No.: US 7,394,494 B2
(45) Date of Patent: Jul. 1, 2008

(54) SUB-SAMPLING APPARATUS AND METHOD AND IMAGE SENSOR EMPLOYING THE SAME

(75) Inventor: Wan-Hee Jo, Kyoungki-do (KR)

(73) Assignee: Hynix Semiconductor Inc., Kyoungki-do (KR)

(*) Notice: Subject to any disclaimer, the term of this patent is extended or adjusted under 35 U.S.C. 154(b) by 1231 days.

(21) Appl. No.: 10/659,563

(22) Filed: Sep. 10, 2003

(65) Prior Publication Data
US 2004/0093475 A1 May 13, 2004

(30) Foreign Application Priority Data
Oct. 10, 2002 (KR) .................... 10-2002-0061732

(51) Int. Cl.
H04N 5/335 (2006.01)
H04N 3/14 (2006.01)

(52) U.S. Cl. .................. 348/320; 348/308; 348/312; 358/445; 358/426; 711/211.1; 711/217

(58) Field of Classification Search ........... 348/320, 348/308; 711/217, 211.1
See application file for complete search history.

(56) References Cited

U.S. PATENT DOCUMENTS

| | | | | |
|---|---|---|---|---|
| 4,206,503 A | * | 6/1980 | Woods et al. | 711/212 |
| 5,124,812 A | * | 6/1992 | Sato et al. | 386/98 |
| 5,208,660 A | * | 5/1993 | Yoshida | 348/555 |
| 6,961,338 B2 | * | 11/2005 | Nabesako et al. | 370/392 |
| 2001/0000819 A1 | * | 5/2001 | Manning | 711/168 |

\* cited by examiner

*Primary Examiner*—Lin Ye
*Assistant Examiner*—Hung Lam
(74) *Attorney, Agent, or Firm*—Marshall, Gerstein & Borun LLP (57) ABSTRACT

The present disclosure relates to an address sub-sampling apparatus and method, and an image sensor employing the same. An address sub-sampling apparatus includes a counting unit that generates a binary address of N bits, N being a natural number larger than 2. The address sub-sampling apparatus also includes an address conversion unit that sub-samples the binary address of N bits to output a sub-sampled address having first, second and third bit groups, wherein the sub-sampled address is arranged in order of the third, the first and the second bit groups from the MSB (Most Significant Bit). The first bit group, which is a combination of digits in the sub-sampled address corresponding to the number of addresses to be skipped, being set as "0", the second bit group, which includes the LSB (Least Significant Bit) corresponding to bits of the binary address, and the third bit group, which includes the MSB being set to shift address subtracted by the number of bits in the first bit group from the MSB in the binary address.

14 Claims, 7 Drawing Sheets

SUB-SAMPLING APPARATUS AND METHOD AND IMAGE SENSOR EMPLOYING THE SAME

TECHNICAL FIELD

An address sub-sampling technique is disclosed. More particularly, an address sub-sampling apparatus and method, and an image sensor employing the same are disclosed.

DESCRIPTION OF THE RELATED ART

Sub-sampling is also called sampling reduction or MUSE (Multiple sUb-nyquist Sampling Encoding) system. An image displayed on TV, for example, may be divided into two regions: a moving region and a still region. In the moving region, the image may not be sharp and there may also be blurring at a boundary part thereof. In addition, moving objects may have a low resolution. In view of the characteristics of the human eye, moving objects having a low resolution may not be sensed well by the human eye. Based on such characteristics, each image on TV in the MUSE system may be divided into a still region and a moving region, each of which uses different encoding techniques. The bandwidth of an original MUSE signal is 32 MHz where, in each of the above two regions, it is decreased by ¼ resulting in a bandwidth of 8 MHz. The MUSE signal is transmitted over a satellite transmission band of 27 MHz after FM modulating it. In other words, in the moving region, samples of the MUSE signal are compressed by ¼ using sub-sampling and line misalignment sub-sampling at a horizontal axis. In the still region, samples of the MUSE signal are compressed by ½ by performing field misalignment sub-sampling, and field misalignment sub-sampling is performed once again at the time axis based on the concept that there is no picture change between adjacent frames. As a result, in both the moving region and the still region, pixels may be compressed by ¼, and then the ¼ compressed analog samples may be FM modulated to broadcast them over an artificial satellite channel of 27 MHz.

Sub-sampling in an image sensor that is carried out during, for example, view finder or quick view operations may be used to increase rate of frame, while allowing the deterioration of resolution of a broader picture. For this sub-sampling operation, various modes may be provided based upon the design specification. In the pixel array structure, which provides a basic RGB (Red, Green, Blue) Bayer pattern, four pixels are composed as a basic unit. Sub-sampling is generally represented by m×n (herein, m and n are even numbers), where m is the number of addresses to be outputted and n is the number of addresses to be skipped.

For example, in the case of sub-sampling of 2×4, if it is assumed that the start address is "0", addresses to be outputted are in the order of 0, 1, 6, 7, 12, 13. Thus, 2, 3, 4, 5, 8, 9, 10, and 11 are addresses to be skipped. In such a case, when skipping from 1 to 6, the immediate next address would follow without any loss in view of time. However, the conventional method does not apply the skip function as described above, but masks output data in case addresses exist that need to be skipped. Thus, the conventional method has the shortcoming that it does not utilize the advantages of sub-sampling at the time axis.

SUMMARY

In accordance with one aspect, an address sub-sampling apparatus includes a counting unit that generates a binary address of N bits, N being a natural number larger than 2. The address sub-sampling apparatus also includes an address conversion unit that sub-samples the binary address of N bits to output a sub-sampled address having first, second and third bit groups. The sub-sampled address is arranged in order of the third, the first and the second bit groups from the MSB (Most Significant Bit). The first bit group, which is a combination of digits in the sub-sampled address corresponding to the number of addresses to be skipped, being set as "0", the second bit group, which includes the LSB (Least Significant Bit) corresponding to bits of the binary address, and the third bit group, which includes the MSB being set to shift the address subtracted by the number of bits in the first bit group from the MSB in the binary address.

In accordance with another aspect, an image sensor of line scanning manner, includes a first counting unit that generates a first binary address of X bits in synchronization with a preset data clock signal, X being a natural number larger than 2. The image sensor also includes a first address conversion unit that sub-samples the first binary address of X bits to provide a first sub-sampled address having first, second and third bit groups, and a second counting unit that generates a second binary address of Y bits in synchronization with a preset line clock signal, Y being a natural number larger than 2. The image sensor further includes a second address conversion unit that sub-samples the second binary address of Y bits to output a second sub-sampled address having first, second and third bit groups, wherein each of the first and the second sub-sampled addresses is arranged in order of the third, the first and the second bit groups from the MSB. The first bit group, which is a combination of digits in the sub-sampled address corresponding to the number of addresses to be skipped, being set as "0", the second bit group, which includes the LSB corresponding to bits of the binary address, and the third bit group, which includes the MSB being set to shift the address subtracted by the number of bits in the first bit group from the MSB in the binary address.

In accordance with yet another aspect, an address sub-sampling method includes generating a binary address of N bits, N being a natural number larger than 2. The address sub-sampling method also includes sub-sampling the binary address of N bits to output a sub-sampled address that is provided in such a way that third, first, and second bit groups of the sub-sampled address are arranged in sequence from the MSB. The first bit group, which is a combination of digits in the sub-sampled address corresponding to the number of addresses to be skipped, being set as "0", the second bit group, which includes the LSB corresponding to bits of the binary address, and the third bit group, which includes the MSB being set to shift the address subtracted by the number of bits in the first bit group from the MSB in the binary address.

In accordance with yet another aspect, a sub-sampling method for use in an image sensor includes generating a first binary address of X bits in synchronization with a preset data clock signal, and generating a second binary address of Y bits in synchronization with a preset line clock signal, both X and Y being natural numbers larger than 2. The sub-sampling method for use in an image sensor also includes sub-sampling the first and the second binary addresses to output first and second sub-sampled addresses that are provided in such a way that third, first, and second bit groups of each of the first and the second sub-sampled addresses are arranged in sequence from the MSB. The first bit group, which is a combination of digits in the sub-sampled address corresponding to the number of addresses to be skipped, being set as "0", the second bit group, which includes the LSB corresponding to bits of the binary address, and the third bit group, which includes the MSB being set to shift the address subtracted by the number of bits in the first bit group from the MSB in the binary address.

A binary address $2^N$ of N bits provided from a counter is sub-sampled to output a sub-sampled address having first, second and third bit groups, wherein the sub-sampled address is arranged in order of the third, the first and the second bit groups from the MSB. The first bit group, which is a combination of digits in the sub-sampled address corresponding to the number of addresses to be skipped, being set as "0". The second bit group, which includes the LSB corresponds to bits of the binary address, and the third bit group, which includes the MSB is set to shift the address subtracted by the number of bits in the first bit group from the MSB in the binary address.

The sub-sampling mode may be performed in real time by implementing an address conversion device using small-sized logic circuits that employ a bit shifting manner and inserts "0" into a specific bit.

DETAILED DESCRIPTION

Figure 1:
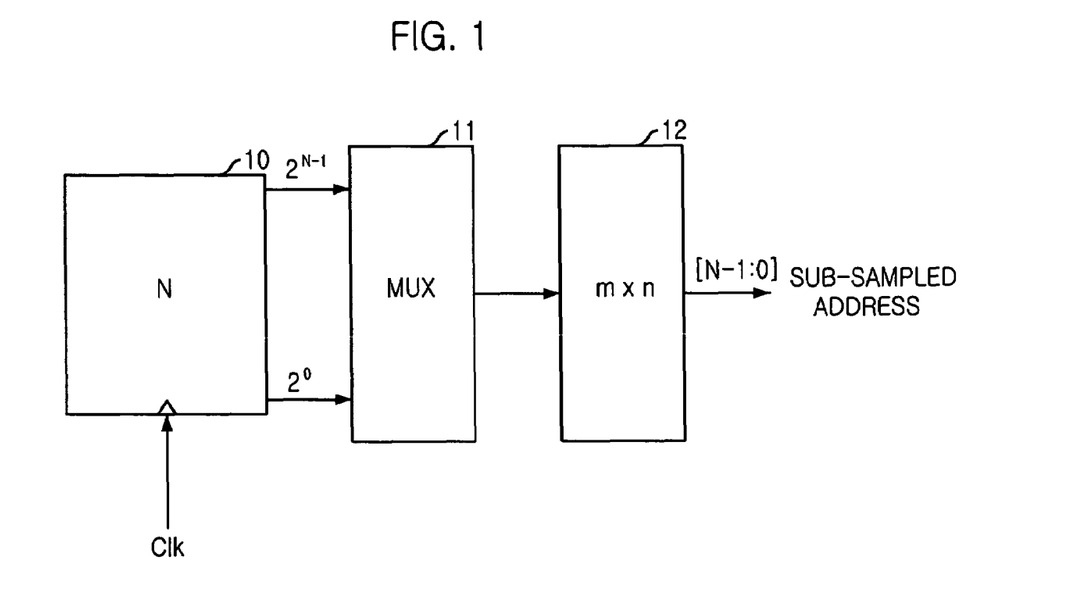
FIG. 1 is an exemplary block diagram of an address sub-sampling apparatus in accordance with one embodiment.

FIG. 1 is an exemplary block diagram showing an address sub-sampling apparatus in accordance with one embodiment. The address sub-sampling apparatus includes a counter 10 that generates a binary address ($2^0 \sim 2^{N-1}$) of N bits (herein, N is a natural number larger than 2), and an address conversion block 12 that outputs a sub-sampled address ([N-1:0]) by sub-sampling the binary address ($2^0 \sim 2^{N-1}$).

In addition, the address sub-sampling apparatus may further include a multiplexer (MUX) 11 that selects one of a plurality of predetermined sub-sampling modes in accordance with the binary address ($2^0 \sim 2^{N-1}$) of N bits. For purposes of illustration, the multiplexer 11 shown in FIG. 1 is provided in the address sub-sampling apparatus. Thus, the address conversion block 12 performs sub-sampling of the binary address in accordance with the address sub-sampling mode selected by the multiplexer 11.

As described above, the binary address of N bits includes $2^0 \sim 2^{N-1}$. Therefore, if it is assumed that the sub-sampling processes are performed m×n times (herein, m is the number of addresses to be outputted and n is the number of addresses to be skipped), m+n should be equal to or smaller than N-1, and m and n should both be even numbers. Thus, all possible modes are 0×0(1), $2^1 \times 2^1$, $2^1 \times 2^2$, ..., $2 \times 2^{N-1}(2^{N-1})$, $2^2 \times$ mode ($2^{N-2}$), ..., $2^{N-2} \times$ mode ($2^2$), $2^{N-1} \times$ mode ($2^1$), and, therefore, the selectable mode number is $2^N - 1$, which is obtained by adding all of them through the use of a geometric series operation.

The address conversion block 12 converts the binary address ($2^0 \sim 2^{N-1}$) into a sub-sampled address, which is formed in such a manner that third, first, and second bit groups of the binary address are arranged in sequence from the MSB (Most Significant Bit). That is, the first bit group, which is a combination of digits in the sub-sampled address corresponding to the number of addresses to be skipped, is set as "0", the second bit group, which includes the LSB (Least Significant Bit), is set as the bits of the binary address from the counter 10, and the third bit group, which includes the MSB, shifts the address subtracted by the number of bits in the first bit group from the MSB in the binary address from the counter 10.

Details of the address sub-sampling process are given below. The following represents an algorithm of 10-bit addresses that is implemented by using known Verilog code:

```
wire [N-1:0] 0by0 = Counter [N-1:0]];
wire [N-1:0] 2By2 = {Counter [N-2:2]}, 1'b0, Counter [0]};
Wire [N-1:0] 4by4 = {Counter [N-2:2]}, 1'b0, Counter [1:0]};
wire [N-1:0] 8by8 = {Counter [N-2:3]}, 1'b0, Counter [2:0]};
wire [N-1:0] 16by16 = {Counter [N-2:4]}, 1'b0, Counter [3:0]};
wire [N-1:0] 2By6 = {Counter [N-3:1]}, 2'b00, Counter [0]};
wire [N-1:0] 2By14 = {Counter [N-4:1]}, 3'b000, Counter[0]};
wire [N-1:0]2by30 = {Counter [N-5:1]}, 4'b0000, Counter[0]};
case(subsamp)                    //<=8 ×1 Mux
'Zero Address=0by0;              //0 × Sub-sampling mode
'One Address=2by2;               //2 ×2 Sub-sampling mode
'Two Address=4by4;               //4 ×4 Sub-sampling mode
'Three Address=8by8;             //8 × 8 Sub-sampling mode
'Four Address=16by16;            //16 ×16 Sub-sampling mode
'Five Address=2by6;              //2 ×6 Sub-sampling mode
'Six Address=2by14;              //2 ×14 Sub-sampling mode
'Seven Address=2by30;            //2 ×30 Sub-sampling mode
```

The above algorithm is represented in Verilog code for performing the sub-sampling operation, and is implemented to synthesize digital logic circuits. Specifically, the address conversion block 12 receives the binary address of N bits outputted from the counter 10 and performs bit operations to generate each sub-sampled address, thereby providing corresponding sub-sampled addresses in accordance with eight (Zero to Seven) predetermined sub-sampling modes as described above.

As is known in the art, Verilog code is classified by wire sentence and case sentence, wherein the wire sentence performs bit operations on the outputs from the counter 10. For example, in the case of sub-sampling of 2By2 (2×2) mode(1), 2×2 of wire sentence is set in such a way that the upper bits [N-2:1] of the output from the counter 10 correspond to bits [N-1:1] of 2By2. In other words, the remaining address, which is subtracted by the number of bits in the first bit group to be set as "0", is shifted from the MSB in the output of the counter 10.

The first bit group, which consists of a combination ($2^1$) of digits in the address to be sub-sampled, which is equal to the number (2) of addresses to be skipped, bit [1] of 2By2, is set as "0" (1'b0). The lower bit[0] of the output from the counter 10 corresponds to "0" of 2By2 (Counter[0]). That is, the second bit group including the LSB is set as the bit applied to the counter 10.

In the case of sub-sampling of 2By30, 2By30 of the wire sentence sets in such a way that upper bits [N-5:1] of the output from the counter 10 correspond to bit [N-1:5] of 2By30, bits [4:1] of 2By30 are fixed to "0", and lower bit [0] of the counter 10 corresponds to bit [0] of 2By2. One of the mode signals from 0by0 to 2By30 obtained by doing so is selectively output from the multiplexer 11, and depends on sub-sampling given by the case sentence. Although an embodiment using the Verilog language is illustratively given for the sake of simplicity, other languages such as VHDL (Very-High speed integrated Description Language), etc. may be used.

Figure 2A:
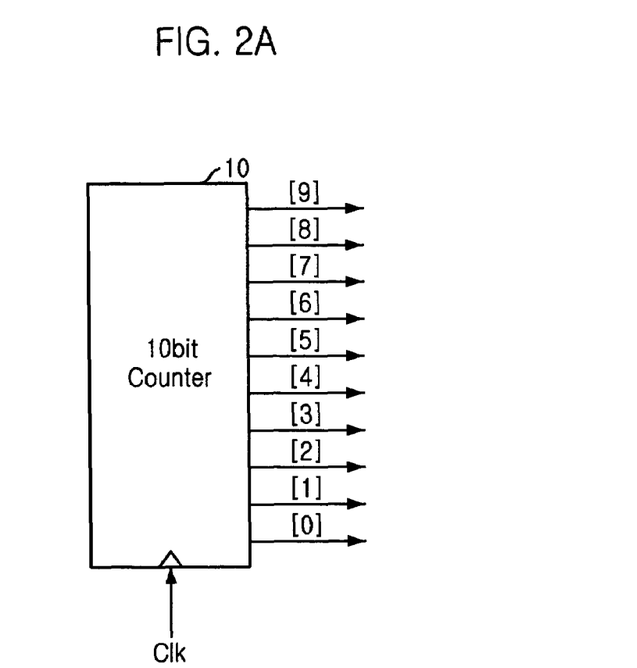
FIGS. 2A to 2E are exemplary block diagrams illustrating one embodiment of a sub-sampling process.
Figure 2B:
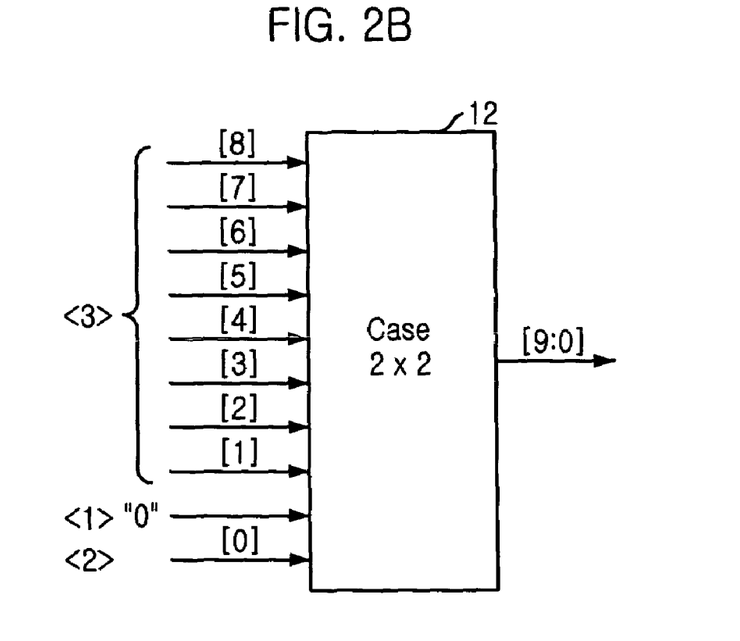

FIGS. 2A to 2E are exemplary block diagrams illustrating one embodiment of a sub-sampling process. In this embodiment, a process of sub-sampling a binary address of 10 bits is provided through several predetermined sub-sampling modes. Referring to FIG. 2A, address [9:0], which is output from the 10-bit counter 10, is sub-sampled by the address conversion block 12 set in the sub-sampling mode of 2×2 shown in FIG. 2B. Here, the first bit group <1>, which is a combination of digits in the address to be sub-sampled which is equal to the number "2" of the address to be skipped, is set as "0". The second bit group <2>, which includes the LSB and is a lower bit of the first bit group <1>, is set as bit [0] sent from the counter 10. In the third bit group <3>, which consists of upper bits of the first bit group <1> and includes the MSB, address [8:1] subtracted by the number (1) of bits in the first bit group <1> from the MSB in the address from the counter 10 is shifted to the upper bits.

Figure 2C:
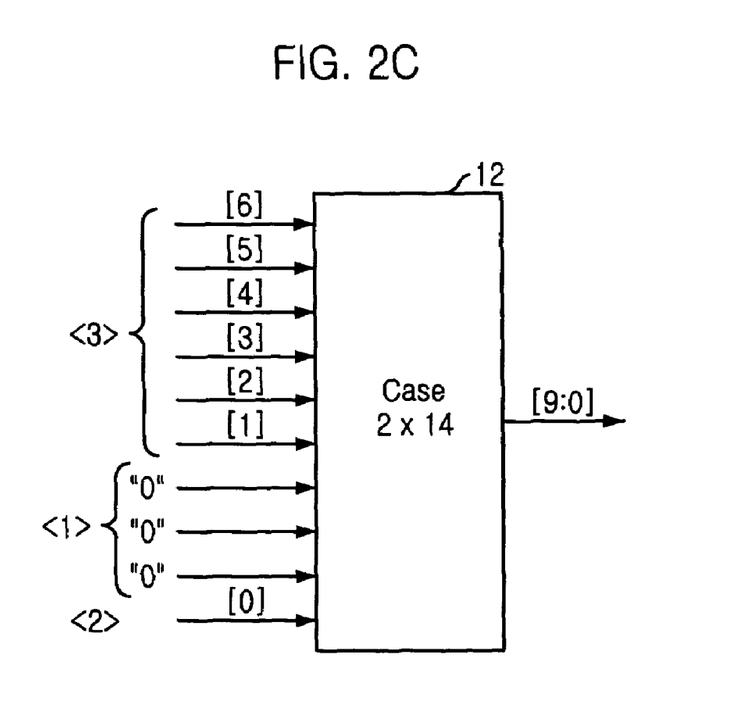

Referring to FIG. 2C, address [9:0], which is output from the 10-bit counter 10 of FIG. 2A is sub-sampled by the address conversion block 12, which is set in the sub-sampling mode of case (2×14). Here, the first bit group <1>, which is a combination of digits in the address to be sub-sampled which is equal to the number "14" of the address to be skipped, is set as "0". The second bit group <2>, which includes the LSB and is a lower bit of the first bit group <1>, is set as bit [0] from the counter 10. In the third bit group <3>, which consists of upper bits of the first bit group <1> and includes the MSB, address [6:1] subtracted by the number (3) of bits in the first bit group <1> from the MSB in the address from the counter 10 is shifted to the upper bits.

Figure 2D:
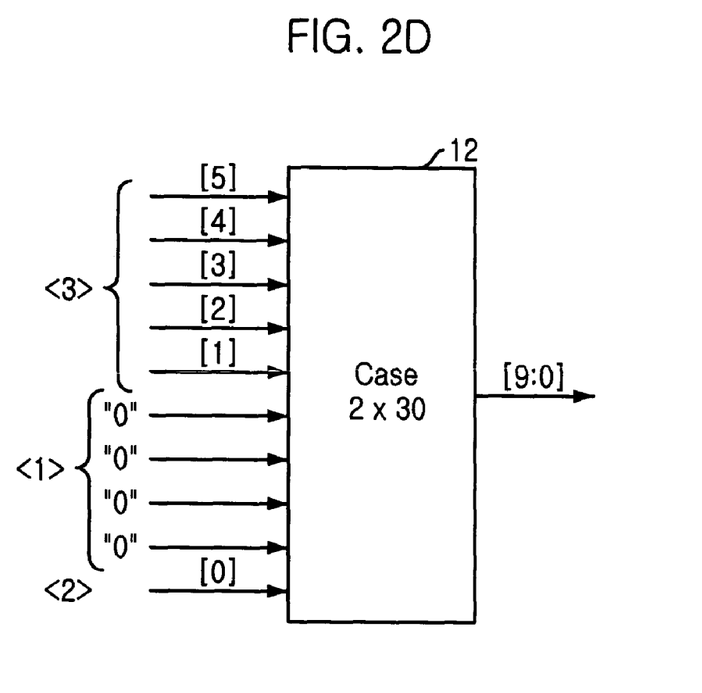

Referring to FIG. 2D, address [9:0], which is output from the 10-bit counter 10 of FIG. 2A, is sub-sampled by the address conversion block 12 set in the sub-sampling mode of 2×30. Here, the first bit group <1>, which is a combination of digits in the address to be sub-sampled which is equal to the number "30" of the address to be skipped is set as "0". The second bit group <2>, which includes the LSB and is a lower bit of the first bit group <1>, is set as bit [0] from the counter 10. In the third bit group <3>, which consists of upper bits of the first bit group <1> and includes the MSB, address [5:1] subtracted by the number (4) of bits in the first bit group <1> from the MSB in the address from the counter 10 is shifted to the upper bits.

Figure 2E:
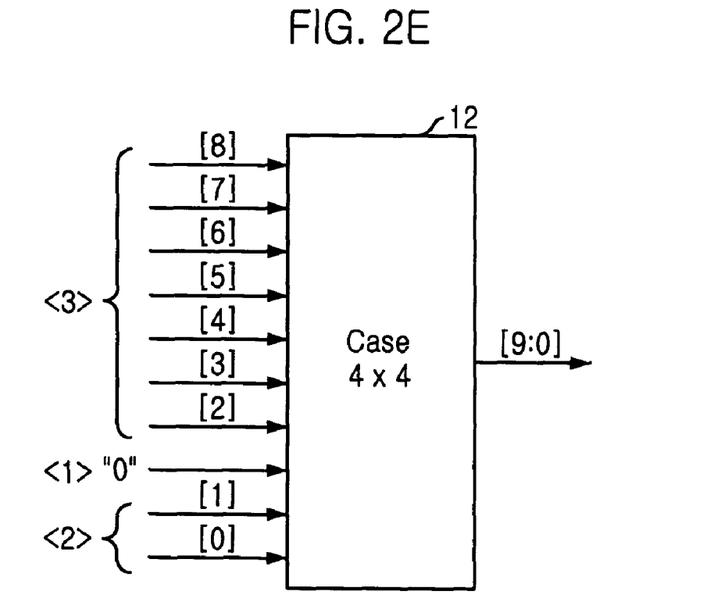

Referring to FIG. 2E, address [9:0], which is output from the 10-bit counter 10 of FIG. 2A, is sub-sampled by the address conversion block 12 set in the sub-sampling mode of 4×4. Here, the first bit group <1>, which is a combination of digits in the address to be sub-sampled which is equal to the number "4" of the address to be skipped, is set as "0". The second bit group <2>, which includes the LSB and is a lower bit of the first bit group <1>, is set as bit [1:0] from the counter 10. In the third bit group <3>, which consists of the upper bits of the first bit group <1> and includes the MSB, address [8:1] subtracted by the number (1) of bits in the first bit group <1> from the MSB in the address from the counter 10 is shifted to the upper bits.

Figure 3A:
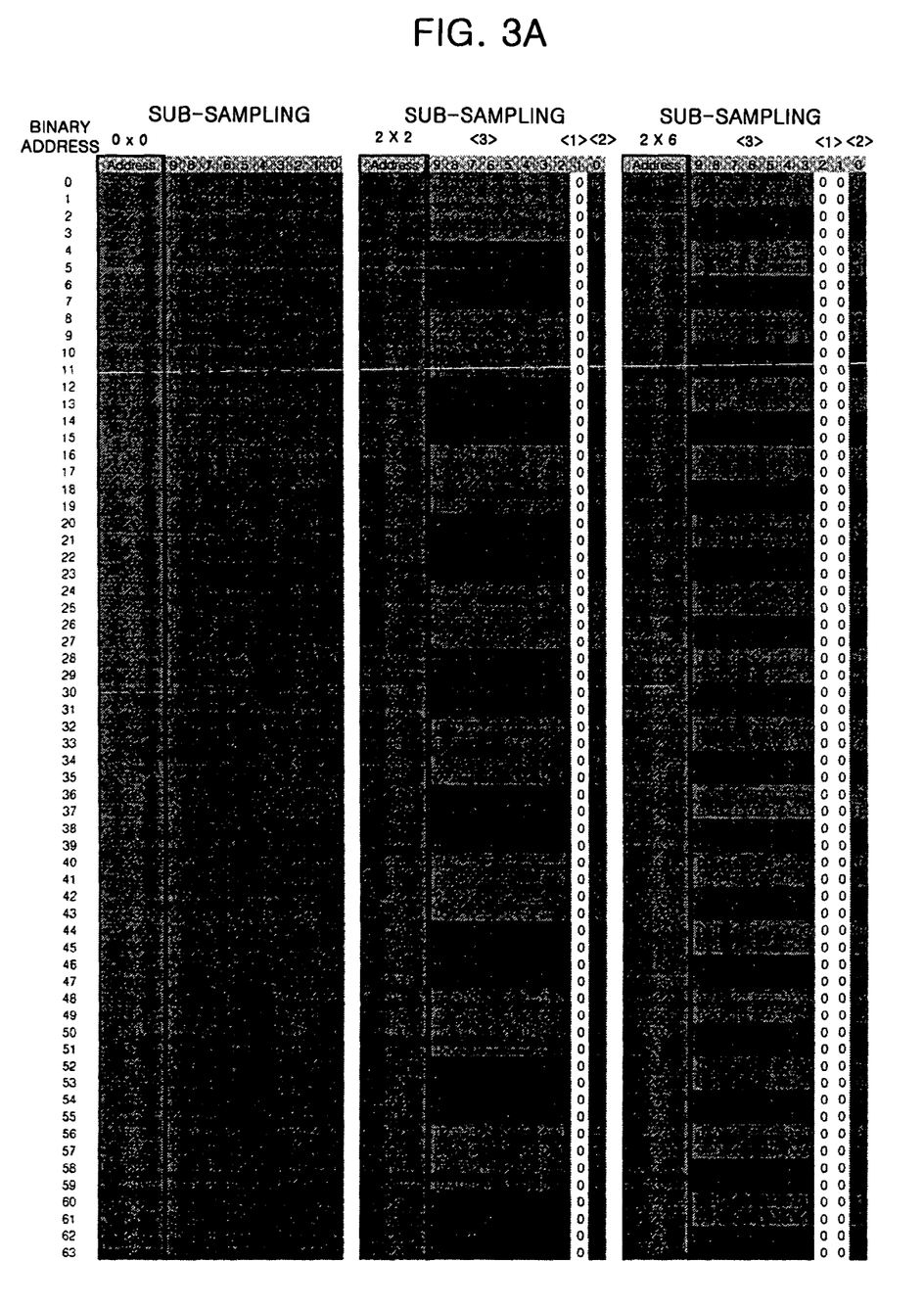
FIGS. 3A to 3C are tables showing the results of 10-bit sub-sampling.
Figure 3B:
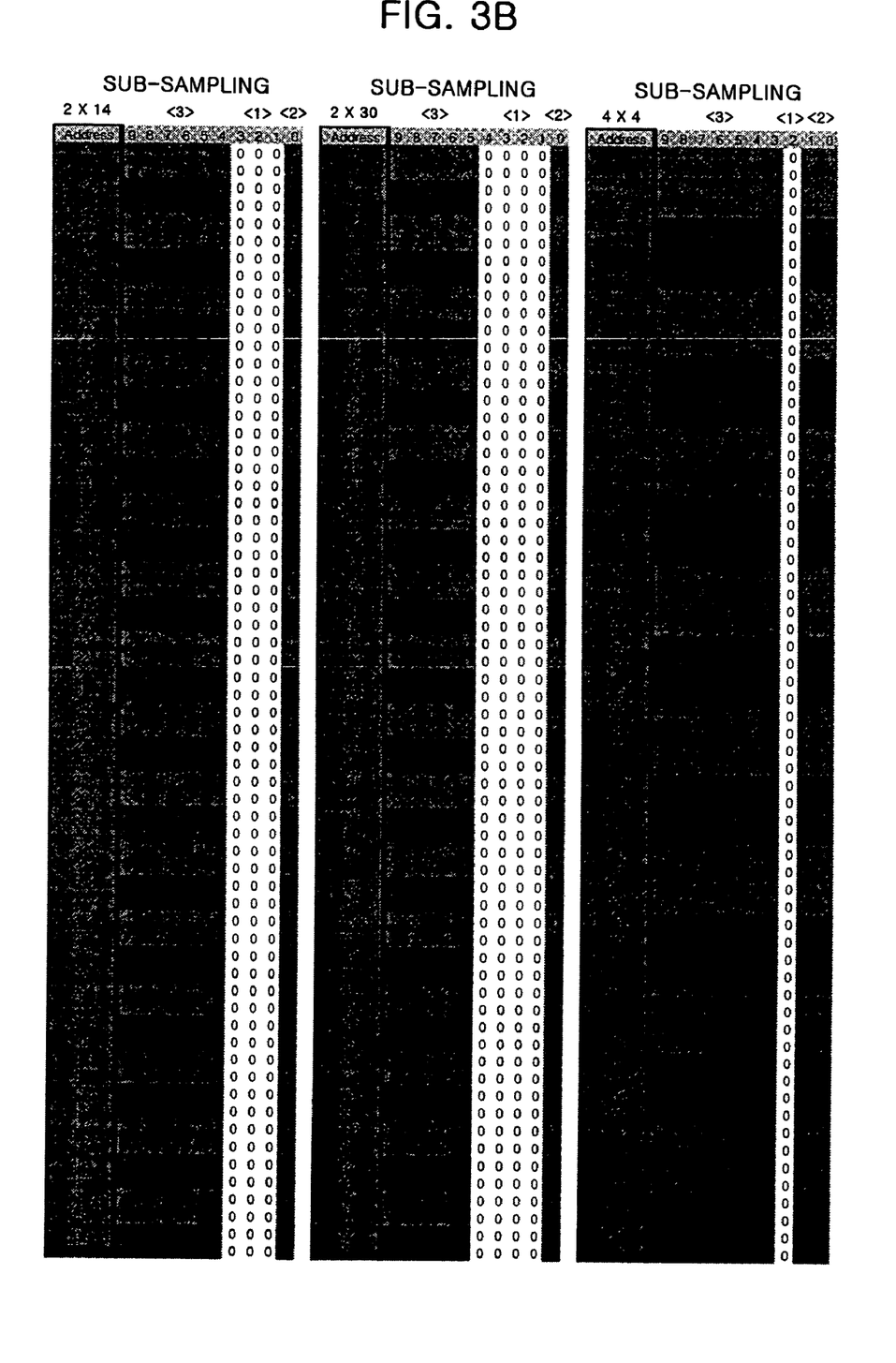
Figure 3C:
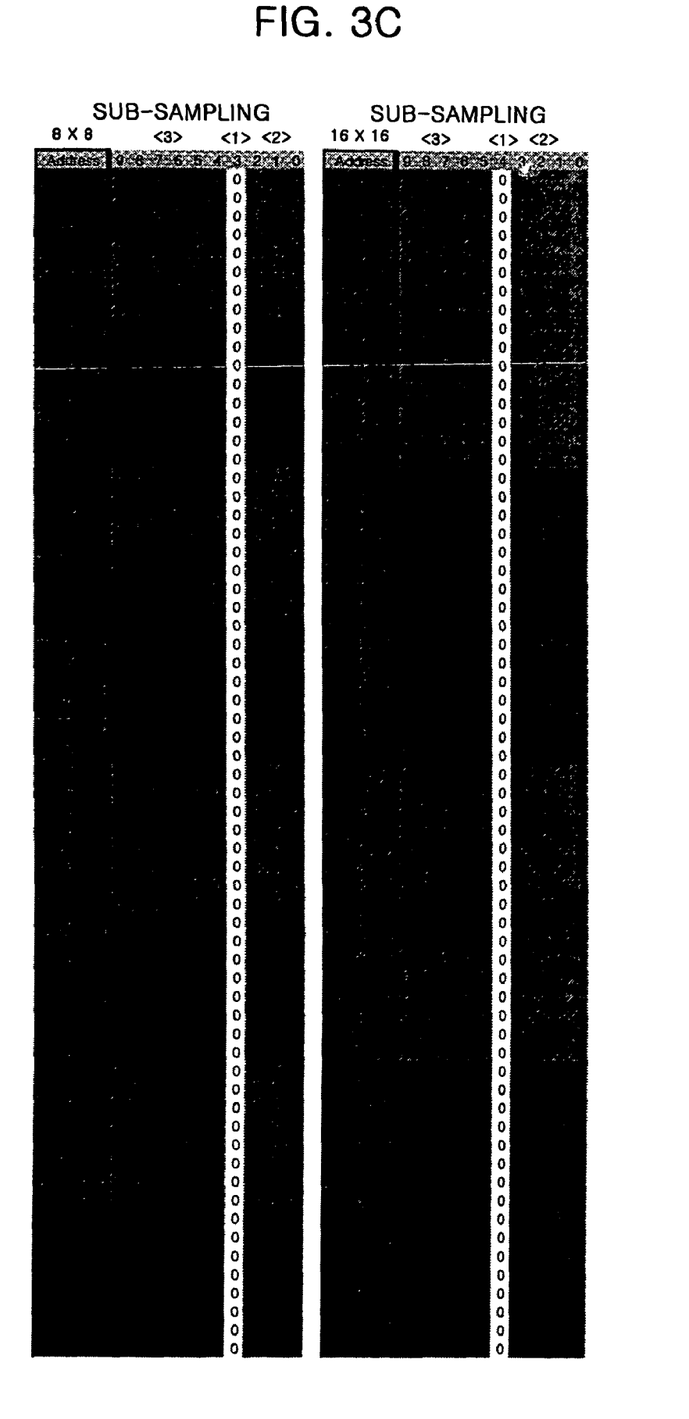

FIGS. 3A to 3C show sub-sampling tables representing the sub-sampling results of 10 bits in accordance with one embodiment. In other words, FIGS. 3A to 3C represent a sub-sampled address that is obtained by sub-sampling the binary address from the counter 10 in synchronization with the clock signal (Clk) from the counter 10 at the address conversion block 12. The output of the counter 10 is represented by the decimal number on the left part of the table, and the decimal number and binary number of its address are represented together on the upper side of the table. Further, it can be seen that the table depends on rules of the first to third bit groups <1>~<3> of the sub-sampled address. That is, it can be seen that columns of the first bit group <1> represented by white in each mode are all set as "0".

Figure 4:
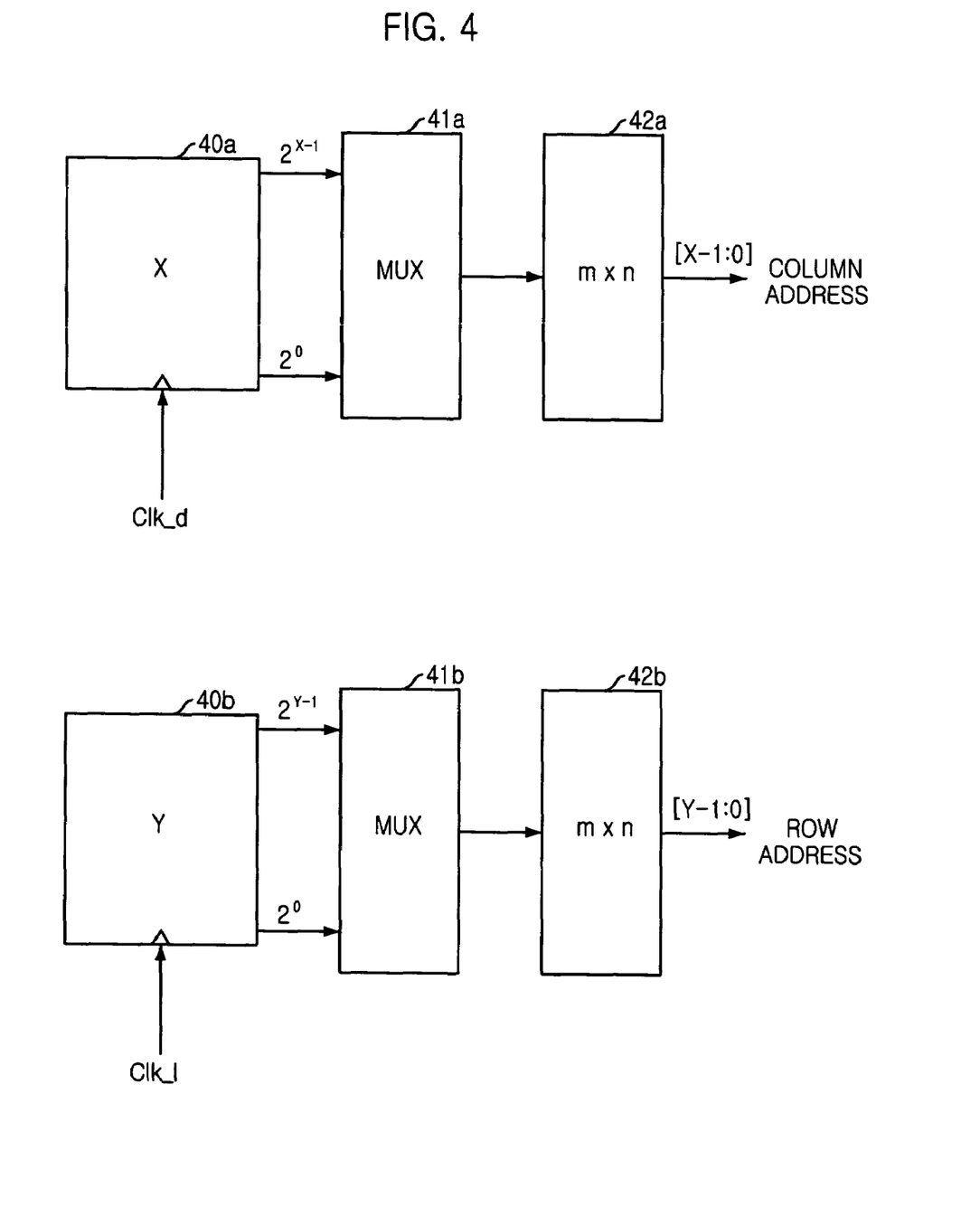
FIG. 4 is an exemplary block diagram of an image sensor in accordance with another embodiment.

FIG. 4 is a block diagram illustrating an image sensor in accordance with another embodiment. The image sensor includes a first counter 40a that generates a binary address of X (herein, X is a natural number larger than 2) bits in synchronization with a preset data clock signal (Clk.d) in a line scan manner that scans one line, i.e., column in synchronization with a line clock signal and then transmits it at once. The image sensor also includes a first address conversion block 42a that sub-samples the binary address ($2^0$~$2^{X-1}$) from the first counter 40a to provide a sub-sampled address [X−1:0], i.e., column address.

The image sensor further includes a second counter 40b, which is operated in synchronization with a line clock signal (Clk.l), that generates a binary address ($2^0$~$2^{Y-1}$) of Y (herein, Y is a natural number larger than 2) bits, and a second address conversion block 42b that sub-samples the binary address ($2^0$~$2^{Y-1}$) from the second counter 40b to provide a sub-sampled address [Y-1:0], i.e., row address.

As illustrated in FIG. 4, the image sensor further includes a first multiplexer 41a that selects one of a plurality of predetermined sub-sampling modes capable of outputting from the binary address ($2^0$~$2^{X-1}$) of X bits, and a second multiplexer 41b for selecting one of a plurality of predetermined sub-sampling modes capable of outputting from the binary address ($2^0$~$2^{Y-1}$) of Y bits. Thus, each of the address conversion blocks 42a and 42b performs a sub-sampling operation based on the corresponding mode selected by each of the multiplexers 41a and 41b. Here, a binary address of N bits includes $2^0$~$2^{X-1}$ for column and $2^0$~$2^{Y-1}$ for row and, therefore, if it is assumed that the sub-sampling processes are performed m×n times (herein, m is the number of addresses to be outputted and n is the number of addresses to be skipped), m+n should be smaller than or equal to N−1, and m and n should both be even numbers. Thus, it can be seen that the number of selectable modes for column and row become $2^0$~$2^{X-1}$ and $2^0$~$2^{Y-1}$, respectively, by performing a geometric series operation.

The first and the second address conversion blocks 40a and 40b convert the binary addresses of $2^0$~$2^{X-1}$ and $2^0$~$2^{Y-1}$ into sub-sampled addresses, column address and row address, which are made in such a way that the third, the first, and the second bit groups are arranged in sequence from the MSB thereof. The first bit group, which is a combination of digits in the sub-sampled address corresponding to the number of addresses to be skipped, is set as "0", the second bit group corresponds to bits of the binary address from the counter, and in the third bit group including the MSB, the address subtracted by the number of bits in the first bit group from the MSB in the address from the counter is shifted to upper bits.

In general, since the image sensor supports operation of line scan manner, as mentioned above, the first counter 40a, the first multiplexer 41a, and the first address conversion block 42a generate the column address, and the second counter 40b, the second multiplexer 41b, and the second address conversion block 42b produce the row address. The first counter 40a, which is a circuit for generating the column address [X−1:0] is operated based on the rate of output of the data, i.e., in synchronization with the data clock signal (Clk.d), and the second counter 40b, which is a circuit for generating the row address [Y-1:0] is operated based on the rate of output of the data, i.e., in synchronization with the line clock signal (Clk.l).

The line clock signal (Clk.l) and the data clock signal (Clk.d) have the relationship of Eq. (1) as follows:

$$\text{Clk.l} = t_{blank} + (Wc \times \text{Clk.d}) \quad \text{Eq.(1)},$$

wherein "$t_{blank}$," which is the time difference between lines, represents a time interval from completion of scanning of a line to before issuing of line clock signal required for scanning of a next line. In addition, the time "$t_{blank}$" includes a time taken for CDS (Correlated Double Sampling), etc.

Specifically, referring to Eq. (1), the line clock signal (Clk.l) has a period that is calculated by adding the time ($t_{blank}$) between the lines to a value that is obtained by multiplying the width of the column of a pixel arrangement block by the data clock signal (Clk.d). For instance, if it is assumed that VGA (Video Graphics Array) is capable of representing 256 colors and its resolution is 640×480, the period of the line clock signal (Clk.l) is longer than that of the data clock signal (Clk.d) since the line clock signal is obtained by adding an additional time to a value that is derived by multiplying the period of the data clock by 640. Further, the fist address conversion block 42a and the second address conversion block 42b employ circuits having the same concept except that the number of bits of addresses is different from each other.

The sub-sampling method of the image sensor will be omitted here for the purpose of simplicity because it may be implemented in the same manner as the inventive sub-sampling described above. As a result, since the address conversion blocks are designed using a small-sized digital logic circuit and may perform the sub-sampling mode in real time, users have access to a wide range of products and may easily support the back-end processing such as, for example, image signal process, image compression, software process, etc.

While the present disclosure has been described with respect to the particular embodiments, it will be apparent to those skilled in the art that various changes and modifications may be made without departing from the spirit and scope of the disclosure as defined in the following claims.

What is claimed is:

1. An address sub-sampling apparatus, comprising:
   a counting unit that generates a binary address of N bits, N being a natural number larger than 2; and
   an address conversion unit that sub-samples the binary address of N bits to output a sub-sampled address having first, second and third bit groups, wherein the sub-sampled address is arranged in order of the third, the first and the second bit groups from the MSB (Most Significant Bit), the first bit group, which is a combination of digits in the sub-sampled address corresponding to the number of addresses to be skipped, being set as "0", the second bit group, which includes the LSB (Least Significant Bit) corresponding to bits of the binary address, and the third bit group, which includes the MSB being set to shift address subtracted by the number of bits in the first bit group from the MSB in the binary address.

2. The apparatus of claim 1, further comprising a multiplexing unit that selects one of a plurality of predetermined sub-sampling modes provided from the binary address of N bits, wherein the address conversion unit performs the sub-sampling operation in accordance with the selected sub-sampling mode.

3. The apparatus of claim 1, wherein the number of the plurality of predetermined sub-sampling modes is $2^N-1$.

4. The apparatus of claim 1, wherein the number of the addresses to be skipped and the number of addresses to be outputted are both even numbers.

5. An image sensor of line scanning manner, comprising:
   a first counting unit that generates a first binary address of X bits in synchronization with a preset data clock signal, X being a natural number larger than 2;
   a first address conversion unit that sub-samples the first binary address of X bits to provide a first sub-sampled address having first, second and third bit groups;
   a second counting unit that generates a second binary address of Y bits in synchronization with a preset line clock signal, Y being a natural number larger than 2; and
   a second address conversion unit that sub-samples the second binary address of Y bits to output a second sub-sampled address having first, second and third bit groups,
   wherein each of the first and the second sub-sampled addresses is arranged in order of the third, the first and the second bit groups from the MSB (Most Significant Bit), the first bit group, which is a combination of digits in the sub-sampled address corresponding to the number of addresses to be skipped, being set as "0", the second bit group, which includes the LSB (Least Significant Bit) corresponding to bits of the binary address, and the third bit group, which includes the MSB being set to shift address subtracted by the number of bits in the first bit group from the MSB in the binary address.

6. The image sensor of claim 5, wherein the first address conversion unit generates a sub-sampled column address, and the second address conversion unit generates a sub-sampled row address.

7. The image sensor of claim 6, further comprising:
   a first multiplexing unit that selects a first sub-sampling mode from a first plurality of predetermined sub-sampling modes provided from the first binary address of X bits; and
   a second multiplexing unit that selects a second sub-sampling mode from a second plurality of predetermined sub-sampling modes provided from the second binary address of Y bits,
   wherein each of the first and the second address conversion units performs sub-sampling operations in accordance with the selected first and second sub-sampling modes, respectively.

8. The image sensor of claim 7, wherein the number of the first plurality of predetermined sub-sampling modes is $2^X-1$, and the number of the second plurality of predetermined sub-sampling modes is $2^Y-1$.

9. The image sensor of claim 5, wherein the number of the addresses to be skipped and the number of addresses to be outputted are both even numbers.

10. The image sensor of claim 5, wherein the preset line clock signal has a time period that is obtained by adding a time interval between the lines to a value that is calculated by multiplying a width of a column of a pixel arrangement device by the data clock signal.

11. An address sub-sampling method, comprising:
    generating a binary address of N bits, N being a natural number larger than 2; and
    sub-sampling the binary address of N bits to output a sub-sampled address that is provided in such a way that third, first, and second bit groups of the sub-sampled addresses are arranged in sequence from the MSB (Most Significant Bit), the first bit group, which is a combination of digits in the sub-sampled address corresponding to the number of addresses to be skipped, being set as "0", the second bit group, which includes the LSB (Least Significant Bit) corresponding to bits of the binary address, and the third bit group, which includes the MSB being set to shift address subtracted by the number of bits in the first bit group from the MSB in the binary address.

12. A sub-sampling method for use in an image sensor, comprising:

generating a first binary address of X bits in synchronization with a preset data clock signal, and generating a second binary address of Y bits in synchronization with a preset line clock signal, both X and Y being natural numbers larger than 2; and sub-sampling the first and the second binary addresses to output first and second sub-sampled addresses that are provided in such a way that third, first, and second bit groups of each of the first and the second sub-sampled addresses are arranged in sequence from the MSB (Most Significant Bit), the first bit group, which is a combination of digits in the sub-sampled address corresponding to the number of addresses to be skipped, being set as "0", the second bit group, which includes the LSB (Least Significant Bit) corresponding to bits of the binary address, and the third bit group, which includes the MSB being set to shift address subtracted by the number of bits in the first bit group from the MSB in the binary address.

13. The method of claim 12, wherein the first sub-sampled address is a column address and the second sub-sampled address is a row address.

14. The method of claim 12, wherein the preset line clock signal has a time period that is obtained by adding a time interval between the lines to a value that is calculated by multiplying a width of a column of a pixel arrangement device by the data clock signal.

* * * * *